(12) United States Patent
Hou et al.

(10) Patent No.: US 10,395,401 B2
(45) Date of Patent: Aug. 27, 2019

(54) METHOD FOR EFFICIENT PARALLEL VISUALIZING VECTOR GRAPHIC

(71) Applicant: ZHEJIANG UNIVERSITY, Hangzhou, Zhejiang (CN)

(72) Inventors: Qiming Hou, Zhejiang (CN); Rui Li, Zhejiang (CN); Kun Zhou, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 576 days.

(21) Appl. No.: 15/118,089

(22) PCT Filed: Aug. 7, 2015

(86) PCT No.: PCT/CN2015/086372
§ 371 (c)(1),
(2) Date: Aug. 10, 2016

(87) PCT Pub. No.: WO2017/024443
PCT Pub. Date: Feb. 16, 2017

(65) Prior Publication Data
US 2019/0197744 A1    Jun. 27, 2019

(51) Int. Cl.
*G06F 17/13* (2006.01)
*G06T 11/40* (2006.01)
(Continued)

(52) U.S. Cl.
CPC .............. *G06T 11/40* (2013.01); *G06F 17/13* (2013.01); *G06F 17/16* (2013.01); *G06T 1/20* (2013.01); *G06T 2200/12* (2013.01)

(58) Field of Classification Search
CPC ..... G06T 11/40; G06T 2200/12; G06F 17/13; G06F 17/16
See application file for complete search history.

(56) References Cited

U.S. PATENT DOCUMENTS

| | | | |
|---|---|---|---|
| 6,606,093 B1 * | 8/2003 | Gossett | G06T 11/203 345/4 |
| 9,697,641 B2 * | 7/2017 | Molnar | G06T 15/005 |
| 2011/0205232 A1 * | 8/2011 | Fujiwara | G06T 11/40 345/441 |

FOREIGN PATENT DOCUMENTS

| | | |
|---|---|---|
| CN | 101211416 | 7/2008 |
| CN | 101923699 | 12/2010 |

OTHER PUBLICATIONS

Charles Loop et al. Resolution Independent Curve Rendering using Programmable Graphics Hardware, ACM Transactions on Graphics (TOG)—Proceedings of ACM SIGGRAPH 2005, vol. 24 Issue 3, Jul. 2005, pp. 1000-1009.
(Continued)

*Primary Examiner* — Grace Q Li (57) ABSTRACT

A method for efficiently visualizing parallel vector data rapidly renders high-quality complex vector graphics. The present invention provides a scanline algorithm for calculating and rendering on contour lines, which parallel-rasterizing on the contour lines. The algorithm firstly rasterizes the contour lines into segments corresponding to output image pixels. On each segment, color values are analytically calculated, or approximately obtained by a sampling algorithm. Contour rasterizing is efficiently completed in parallel. By analytical calculation or 32-bit sampling, high quality results are obtained. The present invention adapts parallel prefixes and algorithms in a scanline direction to obtain covering information for each pixel and generate filled areas. Finally, the contour line segments and the filled areas of the vector graphics are rendered in the output image. The present invention is entirely based on parallel many-core computing devices for real-time high-quality vector graphic rendering with hardware acceleration.

6 Claims, 2 Drawing Sheets

(51) Int. Cl.
G06T 1/20 (2006.01)
G06F 17/16 (2006.01)

(56) References Cited

OTHER PUBLICATIONS

Yoshiyuki Kokojima et al. Resolution independent rendering of deformable vector objects using graphics hardware. SIGGRAPH '06 ACM SIGGRAPH 2006 Sketches. Article No. 118. ISBN:1-59593-364-6.

Wang et al. Antialiasing Technique Based on Vectorial Graphics and Its Applications. Journal of Institute of Surveying and Mapping. vol. 18, No. 3, Sep. 2001, p. 229-231.

* cited by examiner (a)    (b)

METHOD FOR EFFICIENT PARALLEL VISUALIZING VECTOR GRAPHIC

CROSS REFERENCE OF RELATED APPLICATION

This is a U.S. National Stage under 35 U.S.C 371 of the International Application PCT/CN2015/086372, filed Aug. 7, 2015.

BACKGROUND OF THE PRESENT INVENTION

Field of Invention

The present invention relates to a technical field of graphic rendering, and more particularly to a method for efficient parallel visualizing vector graphic.

Description of Related Arts

Related research background of the present invention is briefly described as follows.

Two-dimensional vector graphic rendering is an important field among computer graphics. A vector graphic comprises a contour and a filled area. The contour of the vector graphic is a group of curves connected with adjacent ones, wherein the curves are expressed by mathematical formulas, usually by Bezier curve segments or other rational spline curve segments. The filled area of vector graphics defined by non-zero or even-odd filling rules. Color of the vector graphic may be represented by a single color, a linear gradient color, a radial gradient color, or a texture.

I, Vector Graphic Rendering:

Loop et al. proposed that a vector graphic is divided into triangles, and whether a pixel falls inside the vector graphic is determined in a programmable shader (LOOP, C., AND BLINN, J. 2005. Resolution independent curve rendering using programmable graphics hardware. ACM Trans. Graph. 24, 3 (July), 1000-1009.). Microsoft Direct 2D divides a vector graphic in a trapezium form for rendering, and calculates coverage values on boundaries (KERR, K. 2009. Introducing Direct2D. MSDN Magazine 3, 4.). A method of Kokojima et al. generates triangular covers of a vector graphic, and uses a stencil buffer to render (KOKOJIMA, Y., SUGITA, K., SAITO, T., AND TAKEMOTO, T. 2006. Resolution independent rendering of deformable vector objects using graphics hardware. In ACM SIGGRAPH 2006 Sketches, ACM, New York, N.Y., USA, SIGGRAPH '06.). NVPR (NV path rendering) uses a method based on stencil buffer rendering (KILGARD, M. J., AND BOLZ, J. 2012. GPU-accelerated path rendering. ACM Trans. Graph. 31, 6 (November), 172:1-172:10.), which achieves real-time rendering on a GPU.

Vector texture based methods uses pre-process steps to construct an acceleration data structure, wherein with the data structure, relative positions between points and graphs are rapidly determined and relative information such as color is obtained (NEHAB, D., AND HOPPE, H. 2008. Random-access rendering of general vector graphics. ACM Trans. Graph. 27, 5 (December), 135:1-135:10; WANG, L., ZHOU, K., YU, Y., AND GUO, B. 2010. Vector solid textures. ACM Trans. Graph. 29, 4 (July), 86:1-86:8. etc.). Such algorithms usually take a long time to be completed by a CPU during pre-process. Shortcut tree data structure developed by Ganacim et al. is able to use GPU for parallel construction (GANACIM, F., LIMA, R. S., DE FIGUEIREDO, L. H., AND NEHAB, D. 2014. Massively-parallel vector graphics. ACM Trans. Graph. 33, 6 (November), 229:1-229:14.), but when rendering a complex dynamic vector graphic with a large scale, a cost for generating the data structure is still greater than a cost for rendering.

II, Anti-Aliasing:

Anti-aliasing algorithms are used for canceling distortion on vector graphic boundaries during rendering. NVPR uses a multi-sampling function of OpenGL for anti-aliasing (SEGAL, M., AND AKELEY, K., 2003. The OpenGL graphics system: A specification. http://www.opengl.org/documentation/specs/version1.5/glspec15.pdf.). Multi-sampling calculates a color value of a same pixel for many times for a better anti-aliasing effect, resulting in longer calculation period and lower rendering speed. Manson et al. proposed an analytical calculation method of integrating for anti-aliasing (MANSON, J., AND SCHAEFER, S. 2013. Analytic rasterization of curves with polynomial filters. Computer Graphics Forum (Proceedings of Eurographics) 32, 2, 499-507.), which theoretically obtains an analytic expression to represent area covered by a vector graphic in a pixel, but a rendering speed is slow.

SUMMARY OF THE PRESENT INVENTION

An object of the present invention is to provide a method for effectively parallel visualizing vector graphic, so as to overcome defects of conventional technologies.

Accordingly, in order to accomplish the above object, the present invention provides a method for effectively parallel visualizing vector graphic. The method adopts Bezier curves and rational spline curve for representing vector graphics, and uses a single color, a linear gradient color, or a radial gradient color with a transparency for representing contour colors and filling colors.

The method uses a parallel scanline algorithm, and parallel-accelerates with a graphics processor for rendering. Rendering is firstly provided on each contour line segment of a vector graphic. Each contour line segment is parallel-cut into several segments, and each of the segments is corresponding to a pixel in a rendering result. On each of the segments, according to a contour line segment formula, intermediate results for calculating colors are obtained. Then, based on the intermediate results, on each horizontal scanline, colors on vector graphic contours and filled areas inside the vector graphics are calculated. Finally, contour lines and the filled areas are rendered together, so as to each pixel color of an output image. The method supports non-zero and odd-even filling modes under different utilization conditions. Single color, linear gradient color, and radial gradient color filling modes are supported. Specifically, the present invention comprises two embodiments.

Embodiment 1: A Method for Efficient Parallel Visualizing Vector Graphic, Comprising Steps of (1) parallel-cutting contour lines of vector graphics, wherein each of the contour lines is cut along a pixel boundary for obtaining contour line segments within pixels;

(2) parallel-treating each of the contour line segments based on an anti-aliasing algorithm, so as to obtain intermediate results of each of the contour line segments for calculating a coverage value; wherein the anti-aliasing algorithm is an analytic method, comprising steps of:

calculating the coverage value of each of the pixels based on a formula:

$$F(x, y) = \int\int_{u,v\in M} h(u-x, v-x)\,du\,dv \qquad (1)$$

$$= \oint_{u(t),v(t)\in \partial M} H(u(t)-x, v(t)-y)v'(t)\,dt \qquad (2)$$

$$= F_0(x, y) + \sum_{i=0}^{x-1} F_1(i, y) \qquad (3)$$

wherein:

$$h(u, v) = \begin{cases} 1 & 0 < u, v < 1 \\ 0 & \text{else} \end{cases} \qquad (4)$$

$$H(u, v) = \int_0^u h(s, v)\,ds$$

$$F_0(x, y) = \int_0^1 H(u(t)-x, v(t)-y)v'(t)\,dt$$

$$F_1(x, y) = \int_0^1 H(u(t)-(x+1), v(t)-y)v'(t)\,dt \qquad (5)$$

wherein $F(x, y)$ represents the coverage value of a $(x, y)$ pixel contour within a $(x, y)$ pixel; $u$ and $v$ are coordinates on the vector graphics; $u(t)$ and $v(t)$ are respectively x and y components of a contour line formula within the $(x, y)$ pixel; $M$ represents an internal area of the vector graphics; $\partial m$ is a vector graphic boundary; the function $h$ has a constant value of 1 within a unit pixel with a size of 1×1; and the function $H$ is obtained by lateral integration of the function $h$;

parallel-treating each of the contour line segments, substituting the formula (4) and the formula (5) with an expression of the contour line segments, and calculating the intermediate results $F_0(x, y)$ and $F_1(x, y)$ corresponding to each of the contour line segments;

(3) parallel-sorting the intermediate results corresponding to each of the contour line segments based on pixel positions, and sorting the contour line segments, with a first order of rows and a second order of columns, within each of the vector graphics;

(4) on each scanline of the contour lines within each of the vector graphics, parallel-calculating the coverage value of the contour line segments on the pixels; specifically, parallel-calculating a summation term in the formula (3), which is recorded as:

$$A(x, y) = \sum_{i=0}^{x-1} F_1(i, y)$$

parallel-adding $A(x, y)$ with $F_0(i, y)$ at each of the pixel positions, so as to obtain the coverage value $F(x, y)$ on the pixels;

(5) generating an area for rendering vector graphic filling colors: if adjacent contour line segments are in a same scanline and belong to a same vector graphic, using a filling-rule for judging whether a region between the adjacent contour line segments is inside the same vector graph: judging whether the $A(x, y)$ at a right segment is larger than 0;

parallel-treating all the adjacent contour line segments, and judging whether the region between the adjacent contour line segments is inside the vector graphics with the filling-rule; recording filled areas inside the vector graphics; and (6) rendering the contour line segments and the filled areas: representing all the contour line segments and the filled areas with rectangle primitives; using the coverage value of the contour line segments for anti-aliasing, and rendering all the primitives.

Preferably, the step (1) specifically comprises steps of:

(1-1) inputting the contour lines of the vector graphics and expressing with $P=C(t)$; wherein t is a real number between 0 and 1, and P is a point on the contour lines; parallel-treating each of the contour line segments, so as to obtain a minimum axis-aligned bounding box, the bounding box covers an x-axis range $[x_i, x_h]$ and covers a y-axis range $[y_i, y_h]$, wherein $x_i$, $x_h$, $y_i$ and $y_h$ are respectively an x-axis lower boundary, an x-axis upper boundary, a y-axis lower boundary and a y-axis upper boundary;

(1-2) calculating intersection once every one pixel unit length in the bounding box along an x-axis direction and a y-axis direction, so as to obtain a parameter t of the contour lines at the intersection point; recording all the parameter t in an array $T=[t_i]$ with an ascending order, wherein $t_i$ is a parameter at an $i^{th}$ intersection point; as a result, adjacent parameters in the array T are corresponding to one of the contour line segments; and (1-3) parallel-treating each pair of the adjacent parameters for cutting the contour line formula into cut segments in each of the pixels, and recording the cut segments in an array S; wherein the cut segments belonging to the same vector graphic are continuously recorded in the array S; after cutting, removing the cut segments outside a graph upper boundary or a graph lower boundary.

Preferably, the step (3) specifically comprises steps of: sorting all the values with a parallel segmented sorting algorithm, wherein the contour line segments belonging to the same vector graphic form a single sort segment, and in each segment, y-coordinates of the pixels of the contour line segments are used as first sort key, and x-coordinates of the pixels of the contour line segments are used as second sort key; after sorting, segment values inside each of the vector graphics with the first order of the rows and the second order of the columns.

Embodiment 2: A Method for Efficient Parallel Visualizing Vector Graphic, Comprising Steps of (1) parallel-cutting contour lines of vector graphics, wherein each of the contour lines is cut along a pixel boundary for obtaining contour line segments within pixels;

(2) parallel-treating each of the contour line segments based on an anti-aliasing algorithm, so as to obtain intermediate results of each of the contour line segments for calculating a coverage value; wherein the anti-aliasing algorithm is a multi-sample method, comprising steps of:

adapting a plurality of sampling points for each of the pixels, judging whether the sampling points are inside the vector graphic; representing sampling results inside the pixels with an integer mask numbers; wherein in an integer mask, one binary bit is corresponding to one of the sampling points; the binary bit is 1 if the sampling points are inside the vector graphic, and the binary bit is 0 if the sampling points are outside the vector graphic; calculating masks on each of the pixels by a formula:

$$F(x, y) = F_0(x, y) \oplus \bigoplus_{i=0}^{x-1} F_1(i, y) \quad (6)$$

wherein F(x, y) represents a (x, y) pixel mask; $F_0$(x, y) represents the sampling points to a right of the contour lines inside a (x, y) pixel; $F_1$(x, y) represents the sampling points to the right of the contour lines inside a (x+1, y) pixel;

generating a mask table with pre-calculation, obtaining a mask $F_0$ and a mask $F_1$ of the contour lines segments by searching the mask table during rendering;

(3) parallel-sorting values corresponding to each of the contour line segments based on pixel positions, and sorting the contour line segments, with a first order of rows and a second order of columns, within each of the vector graphics;

(4) on each scanline of the contour line segments within each of the vector graphics, parallel-calculating the coverage value of the contour line segments on the pixels; specifically:

parallel-calculating exclusive or of all the $F_1$ in the formula (6), and recording as:

$$A(x, y) = \bigoplus_{i=0}^{x-1} F_1(i, y)$$

parallel-calculating exclusive or of A(x, y) and $F_0$(i, y) at each of the pixel positions, so as to obtain the F(x, y);

(5) generating an area for rendering vector graphic filling colors: if adjacent contour line segments are in a same scanline and belong to a same vector graphic, using a fill-rule for judging whether a region between the adjacent contour line segments is inside the same vector graphic: judging whether the A(x, y) at a right segment is non-zero;

parallel-treating all the adjacent contour line segments, and judging whether the region between the adjacent contour line segments is inside the vector graphics with the rule; recording filled areas inside the vector graphics; and (6) rendering the contour line segments and the filled areas: representing all the contour line segments and the filled areas with rectangle primitives; using a multi-sampling function of a graph rendering pipeline, using a calculated sampling mask as a rendering sampling mask, and rendering all the primitives.

Preferably, the step (1) specifically comprises steps of:

(1-1) inputting the contour lines of the vector graphics and expressing with P=C(t); wherein t is a real number between 0 and 1, and P is a point on the contour lines; parallel-treating each of the contour line segments, so as to obtain a minimum axis-aligned bounding box, the bounding box covers an x-axis range [$x_i$, $x_h$] and covers a y-axis range [$y_i$, $y_h$], wherein $x_i$, $x_h$, $y_i$ and $y_h$ are respectively an x-axis lower boundary, an x-axis upper boundary, a y-axis lower boundary and a y-axis upper boundary;

(1-2) calculating intersection once every one pixel unit length in the bounding box along an x-axis direction and a y-axis direction, so as to obtain a parameter t of the contour lines at the intersection point; recording all the parameter t in an array T=[$t_i$] with an ascending order, wherein $t_i$ is a parameter at an $i^{th}$ intersection point; as a result, adjacent parameters in the array T are corresponding to one of the contour line segments; and (1-3) parallel-treating each pair of the adjacent parameters for cutting the contour line formula into cut segments in each of the pixels, and recording the cut segments in an array S;

wherein the cut segments belonging to the same vector graphic are continuously recorded in the array S; after cutting, removing the cut segments outside a graph upper boundary or a graph lower boundary.

Preferably, the step (3) specifically comprises steps of: sorting all the values with a parallel segmented sorting algorithm, wherein the contour line segments belonging to the same vector graphic form a single segment, and in each segment, y-coordinates of the pixels of the contour line segments are used as first sorting key, and x-coordinates of the pixels of the contour line segments are used as second sorting key; after sorting, sorting segment values inside each of the vector graphics with the first order of the rows and the second order of the columns.

Beneficial effects of the present invention are as follows.

(1) The present invention is able to render standard vector graphics. The present invention supports standard vector graphic representation; supports representing vector graphic boundaries with linear, quadratic, and cubic Bezier curves, and quadratic rational spline boundary curves; supports the single color, the linear gradient color, and the radial gradient color filling modes; and supports filling with transparency.

(2) The present invention is able to quickly render complex vector graphics. The embodiments of the present invention provide simple and universal parallel computing steps, which is suitable for all types of many-core systems and graphics processor devices.

(3) The present invention is able to render high-quality anti-aliased vector graphics. The present invention supports two anti-aliasing method comprising analytical calculation and multi-sampling, so as to achieve high-quality anti-aliasing effects.

DETAILED DESCRIPTION OF THE PREFERRED EMBODIMENT

Referring drawings and a preferred embodiment, the present invention is further illustrated.

Difficulty of vector graphics rendering technical lays in quickly judging whether pixels are inside the vector graphics, and anti-aliasing of rendering artifacts. The present invention provides a method for efficiently parallel-rendering of the vector graphics. The method firstly cuts contour lines of the vector graphics along a pixel boundary for obtaining contour line segments with pixel sizes, and then uses the contour line segments as units for parallel processing. The present invention uses two anti-aliasing methods comprising analytical one and sample bit mask one for calculating each pixel coverage of the vector graphic.

Figure 1:
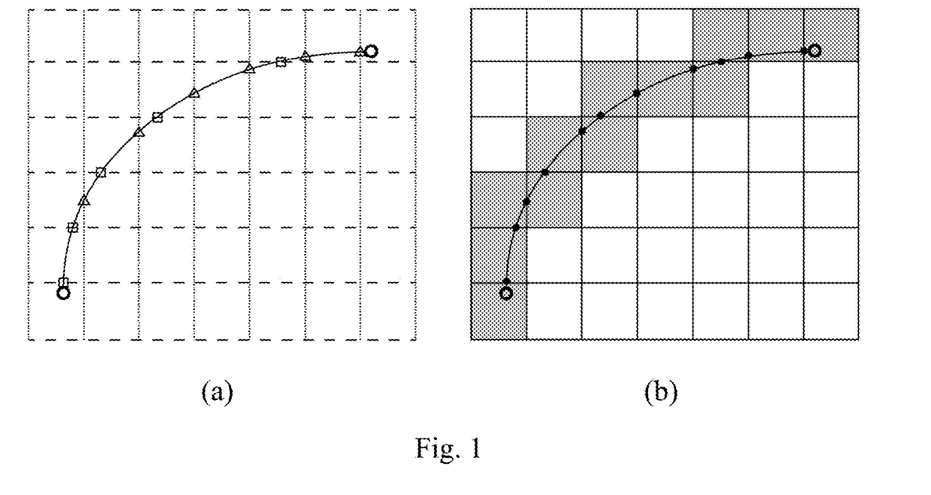
FIG. 1: (a) illustrates cutting a contour line into contour line segments along pixel boundaries. Short dashed lines are vertical pixel boundaries, long dashed lines are horizontal pixel boundaries. Square symbols are intersection points of the contour line and the lateral pixel boundaries, and triangular symbols are intersection points of the contour line and the vertical pixel boundaries. After being cut along the intersection points, the contour line forms the contour line segments as shown in (b), wherein the contour line segments are divided by solid black dots, and each dark square corresponds to pixels where the contour line is located.

The present invention is a method for effectively parallel visualizing vector graphics, comprising steps of:

(1) parallel-cutting contour lines, which specifically comprises steps of:

(1-1) inputting the contour lines of the vector graphics and expressing with P=C(t); wherein t is a real number between 0 and 1, and P is a point on the contour lines; parallel-treating each of the contour line segments, so as to obtain a minimum axis-aligned bounding box, the bounding box covers an x-axis range $[x_l, x_h]$ and covers a y-axis range $[y_l, y_h]$, wherein $x_l$, $x_h$, $y_l$ and $y_h$ are respectively an x-axis lower boundary, an x-axis upper boundary, a y-axis lower boundary and a y-axis upper boundary;

(1-2) calculating intersection once every one pixel unit length in the bounding box along an x-axis direction and a y-axis direction, so as to obtain a parameter t of the contour lines at the intersection point; recording all the parameter t in an array $T=[t_i]$ with an ascending order, wherein $t_i$ is a parameter at an $i^{th}$ intersection point; as a result, adjacent parameters in the array T are corresponding to one of the contour line segments (as shown in FIG. 1); and (1-3) parallel-treating each pair of the adjacent parameters for cutting the contour line formula into cut segments in each of the pixels, and recording the cut segments in an array S; wherein the cut segments belonging to the same vector graphic are continuously recorded in the array S; after cutting, removing the cut segments outside a graph upper boundary or a graph lower boundary;

(2) parallel-treating each of the contour line segments based on an anti-aliasing algorithm, so as to obtain intermediate results of each of the contour line segments for calculating a coverage value; wherein the present invention supports two different anti-aliasing algorithms, comprising:

(2-1) an analytical method:

calculating the coverage value of each of the pixels based on a formula:

$$F(x, y) = \iint_{u,v \in M} h(u - x, v - x) du dv \quad (1)$$

$$= \oint_{u(t),v(t) \in \partial M} H(u(t) - x, v(t) - y) v'(t) dt \quad (2)$$

$$= F_0(x, y) + \sum_{i=0}^{x-1} F_1(i, y) \quad (3)$$

wherein:

$$h(u, v) = \begin{cases} 1 & 0 < u, v < 1 \\ 0 & \text{else} \end{cases} \quad (4)$$

Figure 2:
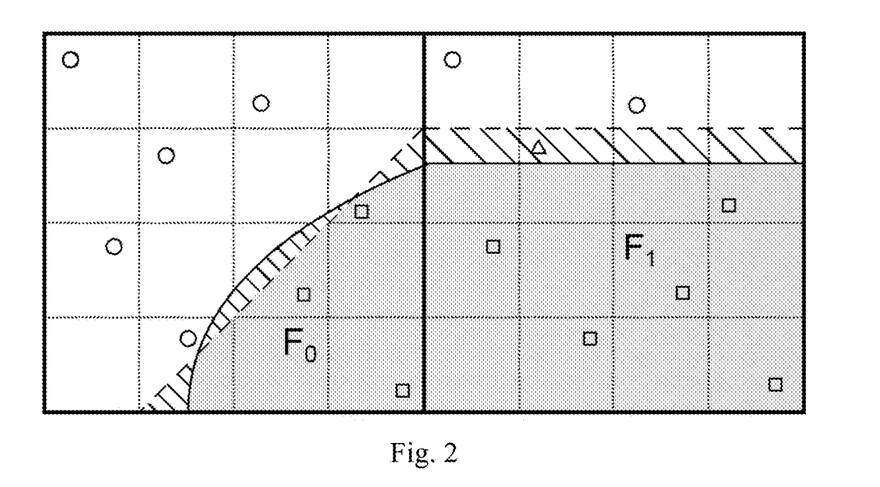
FIG. 2 illustrates calculation of $F_0$ and $F_1$ in sampling bit masks. Thick lines are pixel boundaries. Short dotted lines represent vertex division according to a pre-calculation table. Dark parts are inside the vector graphic. Left pixels are current-processed pixels. Circular dots represent sampling points outside the vector graphic; square dots inside the left pixels are $F_0$, square dots and triangle dots represent inside right pixels are $F_1$; and the triangle dots represent sample errors caused by approximate contour lines.

-continued $$H(u, v) = \int_o^u h(s, v) ds$$

$$F_0(x, y) = \int_0^1 H(u(t) - x, v(t) - y) v'(t) dt$$

$$F_1(x, y) = \int_0^1 H(u(t) - (x + 1), v(t) - y) v'(t) dt \quad (5)$$

wherein F(x, y) represents the coverage value of a (x, y) pixel contour within a (x, y) pixel; u and v are coordinates on the vector graphics; u(t) and v(t) are respectively x and y components of a contour line formula within the (x, y) pixel; M represents an internal area of the vector graphics; $\partial m$ is a vector graphic boundary; the function h has a constant value of 1 within a unit pixel with a size of 1×1; and the function H is obtained by lateral integration of the function h; wherein the formula (3) is obtained by rewriting the formula (2), and is able to specifically rewritten into the formula (4) and the formula (5);

parallel-treating each of the contour line segments, substituting the formula (4) and the formula (5) with an expression of the contour line segments, and calculating the intermediate results $F_0(x, y)$ and $F_1(x, y)$, which is used in the formula (3) and corresponding to each of the contour line segments; recording the $F_0(x, y)$ and the $F_1(x, y)$ in an array $F_0$ and an array $F_1$;

(2-2) a multi-sampling method:

adapting 8, 16 or 32 sampling points for each of the pixels, judging whether the sampling points are inside the vector graphic; representing sampling results inside the pixels with integer mask numbers; wherein in an integer, one binary bit is corresponding to one of the sampling points; the binary bit is 1 if the sampling points are inside the vector graphic, and the binary bit is 0 if the sampling points are outside the vector graphic; calculating masks on each of the pixels by a formula:

$$F(x, y) = F_0(x, y) \oplus \bigoplus_{i=0}^{x-1} F_1(i, y) \quad (6)$$

wherein F(x, y) represents a (x, y) pixel mask; $F_0(x, y)$ represents the sampling points to a right of the contour lines inside a (x, y) pixel; $F_1(x, y)$ represents the sampling points to the right of the contour lines inside a (x+1, y) pixel (as shown in FIG. 2);

for accelerating rendering, generating a mask table with pre-calculation, obtaining a mask $F_0$ and a mask $F_1$ of the contour lines segments by searching the mask table during rendering;

wherein during pre-calculating, each of the pixels are divided in n*n grids; starting from each grid point, k line segments extending to the pixel boundary are obtained, clockwise angles of the line segments according to a positive direction of the x-axis are evenly distributed within 360 degrees; for each of the line segments, the corresponding $F_0$ and $F_1$ are calculated, and the grid point positions and angles are used as an index for recording in the mask table; values of n and k are all positive integer according to detailed conditions;

during rendering, parallel-treating each of the contour line segments, approximately representing the contour line segments with the line segments; according to positions and angles of the line segments, searching the pre-calculated mask table for rapidly finding values of the $F_0$ and $F_1$ and recording in an array $F_0$ and an array $F_1$;

(3) parallel-sorting the contour line segments: in the parallel-generated contour line segment array $F_0$ and $F_1$, adjacently sorting segment values belonging to the same vector graphic; in the same vector graphic, adjacently sorting values of a same segment; according to the present invention, sorting all the values with a parallel segmented sorting algorithm, wherein the contour line segments belonging to the same vector graphic form a single segment, and in each segment, y-coordinates of the pixels of the contour line segments are used as first key words, and x-coordinates of the pixels of the contour line segments are used as second key words; and after sequencing, sorting segment values inside each of the vector graphics with the first order of the rows and the second order of the columns;

(4) on each line of the contour lines within each of the vector graphics, parallel-calculating the coverage value of the contour line segments on the pixels; specifically:

(4-1) for the analytical method:

using parallel prefixes and algorithms, and calculating a summation term in the formula (3), which is recorded as:

$$A(x, y) = \sum_{i=0}^{x-1} F_1(i, y)$$

then parallel-adding A(x, y) with $F_0(i, y)$ at each of the pixel positions, so as to obtain the coverage value F(x, y) on the pixels; and recording A in an array A for subsequent calculation;

(4-2) for the multi-sampling method:

using parallel prefixes and algorithms, and calculating exclusive or of all the $F_1$ in the formula (6), and recording as:

$$A(x, y) = \bigoplus_{i=0}^{x-1} F_1(i, y)$$

parallel-calculating exclusive or of A(x, y) and $F_0(i, y)$ at each of the pixel positions, so as to obtain the F(x, y); and recording A in an array A for subsequent calculation;

(5) generating an area for rendering vector graphic filling colors: if adjacent contour line segments are in a same line or belong to a same vector graphic, using a rule for judging whether a region between the adjacent contour line segments is inside the same vector graph:

(5-1) for the analytical method: judging whether the A(x, y) at a right segment is larger than 0;

(5-2) for the multi-sampling method: judging whether the A(x, y) at a right segment is non-zero;

parallel-treating all the adjacent contour line segments, and judging whether the region between the adjacent contour line segments is inside the vector graphics with the rule; wherein if the region is inside the vector graphics, y-coordinates of the region, an x-direction initial coordinate of the region, an x-direction end coordinate of the region, and filling colors or filling methods of the vector graphics are recorded; and (6) rendering the contour line segments and the filled areas: representing all the contour line segments and the filled areas with rectangle primitives; wherein the square primitives with a height of 1 and a width equaling to a filled area width are generated for the filled areas, and primitives with a height of 1 and a width of 1 are generated for the contour line segments; the primitives comprises the original contour line segments or filled information of the filled areas; for the two anti-aliasing methods, using different methods for generating values of the primitives corresponding to the contour line segments:

(6-1) for the analytical method: using the coverage value of the contour line segments as an alpha (color mixing) value, and multiplying a filling color alpha value of the boundary, so as to a rectangle primitive alpha value; then using an alpha mixing function of a graph rendering pipeline, and rendering all the primitives;

(6-2) for the multi-sampling method: using a multi-sampling function of a graph rendering pipeline, using a calculated sampling mask as a rendering sampling mask, and rendering all the primitives.

Thus, vector graphic rendering according to the present invention is completed.

Preferred Embodiment

The inventor practiced the present invention on a NVIDIA GTX 980 graphics processor. The preferred embodiment is able to efficiently render high-quality complex vector graphics with a parallel graphics processor. With the preferred embodiment, a rendering speed of complex vector graphics are 30 frames per second or more.

Table 1 illustrates time and memory consumptions for rendering different vector graphics according to the preferred embodiment.

|  |  |  |  | time consumption per frame (ms) | | | |
| --- | --- | --- | --- | --- | --- | --- | --- |
| vector graph | resolution | path quantity | curve quantity ($10^3$) | 8-bit multi-sampling | 32-bit multi-sampling | analytical calculation | memory consumption (MB) |
| holding Earth | 1024 × 1096 | 255 | 5 | 3.2 | 3.8 | 3.0 | 4 |
| car | 1024 × 682 | 420 | 12 | 2.2 | 2.6 | 2.1 | 6 |
| tiger | 1024 × 625 | 302 | 28 | 3.1 | 3.8 | 3.0 | 7 |
| Hawaii map | 1024 × 844 | 1137 | 260 | 5.3 | 6.8 | 5.1 | 28 |
| Boston map | 1024 × 917 | 1922 | 1042 | 4.4 | 5.0 | 4.2 | 43 |
| paper | 1024 × 1325 | 5108 | 99 | 2.7 | 3.3 | 2.5 | 12 |
| contour map | 1024 × 1024 | 53214 | 188 | 4.4 | 5.1 | 4.3 | 42 |
| Pairs map 70 | 470 × 453 | 45590 | 890 | 6.1 | 6.9 | 6.1 | 70 |
| Pairs map 50 | 657 × 635 | 45796 | 925 | 7.4 | 8.4 | 7.3 | 83 |
| Pairs map 30 | 1096 × 1060 | 50690 | 1650 | 13.2 | 15.2 | 12.9 | 156 |

Figure 3:
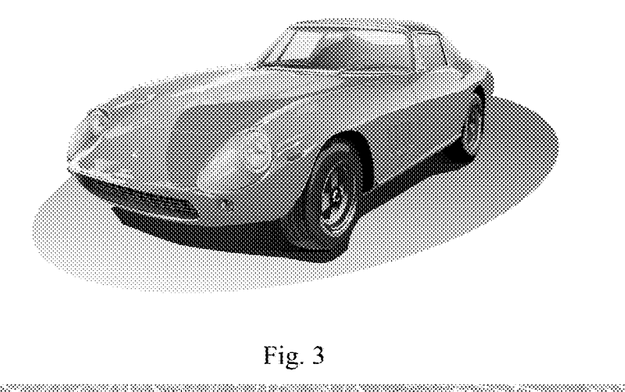
FIG. 3 is a car vector graphic rendered with 32-bit multi-sampling anti-aliasing according to a preferred embodiment of the present invention, which is rendered with a resolution of 1024×682, comprising 420 graphics and 12000 boundary lines.
Figure 4:
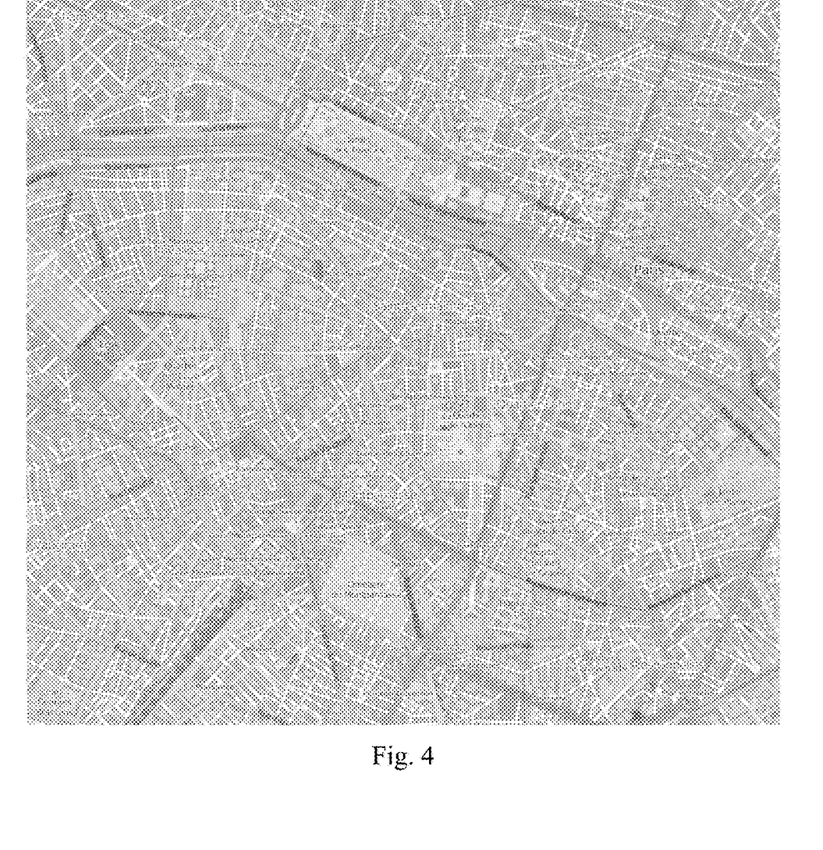
FIG. 4 is a Paris map vector graphic rendered with analytical method anti-aliasing according to the preferred embodiment of the present invention, which is rendered with a resolution of 1096×1060, comprising 50690 graphics and 1650000 boundary lines.

Referring to FIGS. 3-4, rendering results of the car and the Pairs map 30 in the above table are illustrated, which may be cut due to setting type.

According to the preferred embodiment, the present invention is able to rapidly render high-quality vector graphics.

What is claimed is:

1. A method for effectively parallel visualizing vector graphic, comprising steps of:
   (1) parallel-cutting contour lines of vector graphics, wherein each of the contour lines is cut along a pixel boundary for obtaining contour line segments within pixels;
   (2) parallel-treating each of the contour line segments based on an anti-aliasing algorithm, so as to obtain intermediate results of each of the contour line segments for calculating a coverage value; wherein the anti-aliasing algorithm is an analytic method, comprising steps of:
   calculating the coverage value of each of the pixels based on a formula:

$$F(x, y) = \int\int_{u,v \in M} h(u-x, v-x) du dv \quad (1)$$

$$= \oint_{u(t),v(t) \in \partial M} H(u(t)-x, v(t)-y)v'(t) dt \quad (2)$$

$$= F_0(x, y) + \sum_{i=0}^{x-1} F_1(i, y) \quad (3)$$

wherein:

$$h(u, v) = \begin{cases} 1 & 0 < u, v < 1 \\ 0 & \text{else} \end{cases} \quad (4)$$

$$H(u, v) = \int_0^u h(s, v) ds$$

$$F_0(x, y) = \int_0^1 H(u(t)-x, v(t)-y)v'(t) dt$$

$$F_1(x, y) = \int_0^1 H(u(t)-(x+1), v(t)-y)v'(t) dt \quad (5)$$

wherein $F(x, y)$ represents the coverage value of a $(x, y)$ pixel contour within a $(x, y)$ pixel; u and v are coordinates on the vector graphics; $u(t)$ and $v(t)$ are respectively x and y components of a contour line formula within the $(x, y)$ pixel; M represents an internal area of the vector graphics; $\partial m$ is a vector graphic boundary; the function h has a constant value of 1 within a unit pixel with a size of 1×1; and the function H is obtained by lateral integration of the function h;
   parallel-treating each of the contour line segments, substituting the formula (4) and the formula (5) with an expression of the contour line segments, and calculating the intermediate results $F_0(x, y)$ and $F_1(x, y)$ corresponding to each of the contour line segments;
   (3) parallel-sorting values corresponding to each of the contour line segments based on pixel positions, and sorting the contour line segments, with a first order of rows and a second order of columns, within each of the vector graphics;
   (4) on each line of the contour lines within each of the vector graphics, parallel-calculating the coverage value of the contour line segments on the pixels; specifically, parallel-calculating a summation term in the formula (3), which is recorded as:

$$A(x, y) = \sum_{i=0}^{x-1} F_1(i, y)$$

parallel-adding $A(x, y)$ with $F_0(i, y)$ at each of the pixel positions, so as to obtain the coverage value $F(x, y)$ on the pixels;
   (5) generating an area for rendering vector graphic filling colors: if adjacent contour line segments are in a same line or belong to a same vector graphic, using a rule for judging whether a region between the adjacent contour line segments is inside the same vector graph: judging whether the $A(x, y)$ at a right segment is larger than 0;
   parallel-treating all the adjacent contour line segments, and judging whether the region between the adjacent contour line segments is inside the vector graphics with the rule; recording filled areas inside the vector graphics; and
   (6) rendering the contour line segments and the filled areas: representing all the contour line segments and the filled areas with primitives; using the coverage value of the contour line segments for anti-aliasing, and rendering all the primitives.

2. The method, as recited in claim 1, wherein the step (1) specifically comprises steps of:
   (1-1) inputting the contour lines of the vector graphics and expressing with $P=C(t)$; wherein t is a real number between 0 and 1, and P is a point on the contour lines; parallel-treating each of the contour line segments, so as to obtain a minimum axis-aligned bounding box, the bounding box covers an x-axis range $[x_l, x_h]$ and covers a y-axis range $[y_l, y_h]$, wherein $x_l$, $x_h$, $y_l$ and $y_h$ are respectively an x-axis lower boundary, an x-axis upper boundary, a y-axis lower boundary and a y-axis upper boundary;
   (1-2) calculating intersection once every one pixel unit length in the bounding box along an x-axis direction and a y-axis direction, so as to obtain a parameter t of the contour lines at the intersection point; recording all the parameter t in an array $T=[t_i]$ with an ascending order, wherein $t_i$ is a parameter at an $i^{th}$ intersection point; as a result, adjacent parameters in the array T are corresponding to one of the contour line segments; and
   (1-3) parallel-treating each pair of the adjacent parameters for cutting the contour line formula into cut segments in each of the pixels, and recording the cut segments in an array S; wherein the cut segments belonging to the same vector graphic are continuously recorded in the array S; after cutting, removing the cut segments outside a graph upper boundary or a graph lower boundary.

3. The method, as recited in claim 1, wherein the step (3) specifically comprises steps of: sorting all the values with a parallel segmented sorting algorithm, wherein the contour line segments belonging to the same vector graphic form a single segment, and in each segment, y-coordinates of the pixels of the contour line segments are used as first key words, and x-coordinates of the pixels of the contour line segments are used as second key words; and after sequencing, sorting segment values inside each of the vector graphics with the first order of the rows and the second order of the columns.

4. A method for efficient parallel visualizing vector graphic, comprising steps of:

(1) parallel-cutting contour lines of vector graphics, wherein each of the contour lines is cut along a pixel boundary for obtaining contour line segments within pixels;

(2) parallel-treating each of the contour line segments based on an anti-aliasing algorithm, so as to obtain intermediate results of each of the contour line segments for calculating a coverage value; wherein the anti-aliasing algorithm is an analytic method, comprising steps of:

adapting a plurality of sampling points for each of the pixels, judging whether the sampling points are inside the vector graphic; representing sampling results inside the pixels with integer mask numbers; wherein in an integer, one binary bit is corresponding to one of the sampling points; the binary bit is 1 if the sampling points are inside the vector graphic, and the binary bit is 0 if the sampling points are outside the vector graphic; calculating masks on each of the pixels by a formula:

$$F(x, y) = F_0(x, y) \oplus \bigoplus_{i=0}^{x-1} F_1(i, y) \quad (6)$$

wherein F(x, y) represents a (x, y) pixel mask; $F_0(x, y)$ represents the sampling points to a right of the contour lines inside a (x, y) pixel; $F_1(x, y)$ represents the sampling points to the right of the contour lines inside a (x+1, y) pixel;

generating a mask table with pre-calculation, obtaining a mask $F_0$ and a mask $F_1$ of the contour lines segments by searching the mask table during rendering;

(3) parallel-sorting values corresponding to each of the contour line segments based on pixel positions, and sorting the contour line segments, with a first order of rows and a second order of columns, within each of the vector graphics;

(4) on each line of the contour lines within each of the vector graphics, parallel-calculating the coverage value of the contour line segments on the pixels; specifically:

parallel-calculating exclusive or of all the $F_1$ in the formula (6), and recording as:

$$A(x, y) = \bigoplus_{i=0}^{x-1} F_1(i, y)$$

parallel-calculating exclusive or of A(x, y) and $F_0(i, y)$ at each of the pixel positions, so as to obtain the F(x, y);

(5) generating an area for rendering vector graphic filling colors: if adjacent contour line segments are in a same line or belong to a same vector graphic, using a rule for judging whether a region between the adjacent contour line segments is inside the same vector graph: judging whether the A(x, y) at a right segment is non-zero;

parallel-treating all the adjacent contour line segments, and judging whether the region between the adjacent contour line segments is inside the vector graphics with the rule; recording filled areas inside the vector graphics; and (6) rendering the contour line segments and the filled areas: representing all the contour line segments and the filled areas with primitives; using a multi-sampling function of a graph rendering flow line, using a calculated sampling mask as a rendering sampling mask, and rendering all the primitives.

5. The method, as recited in claim 4, wherein the step (1) specifically comprises steps of:

(1-1) inputting the contour lines of the vector graphics and expressing with P=C(t); wherein t is a real number between 0 and 1, and P is a point on the contour lines;

parallel-treating each of the contour line segments, so as to obtain a minimum bounding box aligned with the pixel boundary, then obtaining an x-axis contour line covering area $[x_l, x_h]$ and a y-axis contour line covering area $[y_l, y_h]$, wherein $x_l$, $x_h$, $y_l$ and $y_h$ are respectively an x-axis lower boundary, an x-axis upper boundary, a y-axis lower boundary and a y-axis upper boundary;

(1-2) calculating intersection once every one pixel unit length in the bounding box along an x-axis direction and a y-axis direction, so as to obtain a parameter t of the contour lines at the intersection point; recording all the parameter t in an array $T=[t_i]$ with an ascending order, wherein $t_i$ is a parameter at an $i^{th}$ intersection point; as a result, adjacent parameters in the array T are corresponding to one of the contour line segments; and (1-3) parallel-treating each pair of the adjacent parameters for cutting the contour line formula into cut segments in each of the pixels, and recording the cut segments in an array S; wherein the cut segments belonging to the same vector graphic are continuously recorded in the array S; after cutting, removing the cut segments outside a graph upper boundary or a graph lower boundary.

6. The method, as recited in claim 4, wherein the step (3) specifically comprises steps of: sorting all the values with a parallel segmented sorting algorithm, wherein the contour line segments belonging to the same vector graphic form a single segment, and in each segment, y-coordinates of the pixels of the contour line segments are used as first key words, and x-coordinates of the pixels of the contour line segments are used as second key words; and after sequencing, sorting segment values inside each of the vector graphics with the first order of the rows and the second order of the columns.

* * * * *